6489X

A Greenleaf,

Rotary Steam Engine.

Patented Apr. 18, 1831.

N. PETERS, PHOTO-LITHOGRAPHER, WASHINGTON, D. C.

Apl 18. 1831 [illegible]

Abel Greenleaf 6489X

Letters Patent

The schedule referred to in these Letters Patent and making part of the same contain
ing a description in the words of the said Abel Greenleaf himself of his improve
ment in the Rotary Steam Engine.

Figure 2:
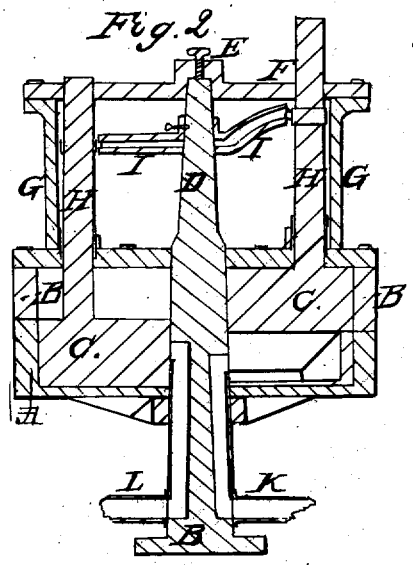
Figure 1:
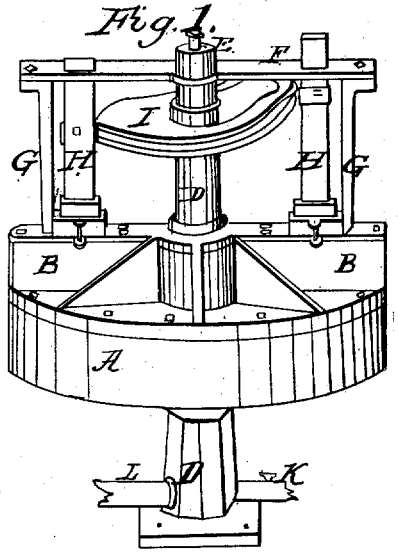
Figure 3:
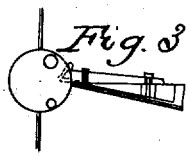

To all whom it may concern. Be it known that I Abel Greenleaf have inven
ted certain improvements in the Rotary Steam Engine and that the follow
ing is a full and exact description of the same; reference being had to the accom
panying drawings. A Fig 1 is the outside of the cylinder within which the
valves and piston operate A A Fig 2 is a section of the same part B B Fig 1 are
valve chambers to receive the valves as the cylinder revolves and thus to allow
the piston to pass them. B B B B in Fig 2 are the valve chambers in section
C C are the valves one of which is shown as raised the other as closed.
The Cylinder turns upon a shaft D D made of iron this
shaft is turned perfectly true and is slightly conical in the part which passes through
the cylinder and the collar which surrounds it between the valve chambers.
It is thus made for the purpose of accurately fitting the revolving part to it as
by raising or lowering this part it may be made to run steam tight without
packing and without binding, to adjust it when it runs horizontally there is a
screw [illegible] passing through the cap bar E which is supported by the uprights G G: other
modes of adjustment being adopted when the position is changed. The valves C C
have stems H H to them which pass through the stuffing boxes in the tops of the valve
chambers. The valves themselves have no packing being closely fitted against the
shaft and sliding in grooves or groves in the cylinder in which they fit steam tight
on each [illegible] of its outside edge. The valves are raised and lowered by means of
a groove formed around a cylinder or upon the rim of a wheel; to which groove
such a direction is given as shall be best adapted to produce the effect intended.
This wheel is turned [illegible] There are friction rollers
which slide in the grooves to avoid the wearing which would otherwise take place
The steam is admitted through the shaft by the steam pipe K and is discharged through that the operation of these openings being similar to those in some other rotary
Engines Fig 3 is a section of the Shaft of the piston and of the lever or arm attach-
to the Shaft by which the piston is fixed [illegible]. As the whole body of the rotary Engine
is intended to have some vertical play upon the Shaft it is necessary that the piston
should also be moveable. This end is attained by allowing some play to the shanks
of the screws by which it is attached to the arm or lever.

Figure 4:
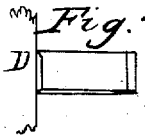
Figure 5:
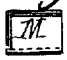

Fig 4 is a side view of the piston. Towards the Shaft D an
opening is shewn: this is intended to receive packing between its back end and
the Shaft which packing is secured by plates of metal screwed over it on one side
Fig 5 is an end view of the piston which is made in two pieces as shewn by the lines
thereon. This is for the purpose of regulating its width with perfect precision. The
double line near the upper part represents a piece of metal through which regu-
-lating screws work; their points bearing upon the parts M. and their threads bea-
ring in the upper plate. Besides the plate of metal, Cloth or other elastic packing, may
be interposed between the two parts The manner of putting this piston together may
be varied and the same end attained namely the adjusting it to the Chamber but
in all its forms the manner of attaching it to the lever or bar to admit of some play
thereon is an essential feature of my invention.

I have described the cylinder as revolving and the Shaft
as Stationary but the intelligent Machinist will perceive that all its essential
features may be preserved and the revolving motion given to the shaft when such
a variation may be preferred. What I claim as my invention is the conical form
given to that part of the Shaft upon which the Cylinder revolves for the purpose of
adjusting them to each other without packing: the attaching the piston to the arm or
lever in such a way as give it play enough to adapt itself to the Chamber of the cylin-
der The manner of forming the piston in parts so as to adjust it to the Cylinder
and the particular manner in which the valves are made to slide through the
head of the cylinder into the valve chambers. Several variations may be made in
the foregoing machine whilst the principles upon which it acts remain un-
changed Thus for example there may be a greater number of valves and pis-
tons Valve chambers may be placed on the ends of the cylinder opposite to that
described and a plate or head put across the Cylinder at right angles with the
Shaft dividing the Steam Chamber into two parts pistons attached to levers or

6489X arms formed upon and operating on the principle described being attached thereto; the Steam being admitted into and escaping from each Chamber as with the Single piston. There may if thought best be two pistons and four valves in each chamber to admit the Steam to act upon both sides of the shaft at the same time. Provision may also be made for admitting Steam through other openings for the purpose of instantaneously reversing the motion when required Witnesses
Jo^s Andrews
Sinclair Sheron Abel Greenleaf Exd
WH 1156 words